W. D. DOOLEY.
MAGNETICALLY OPERATED OIL WELL FISHING TOOL.
APPLICATION FILED APR. 26, 1920.
1,374,834.
Patented Apr. 12, 1921.
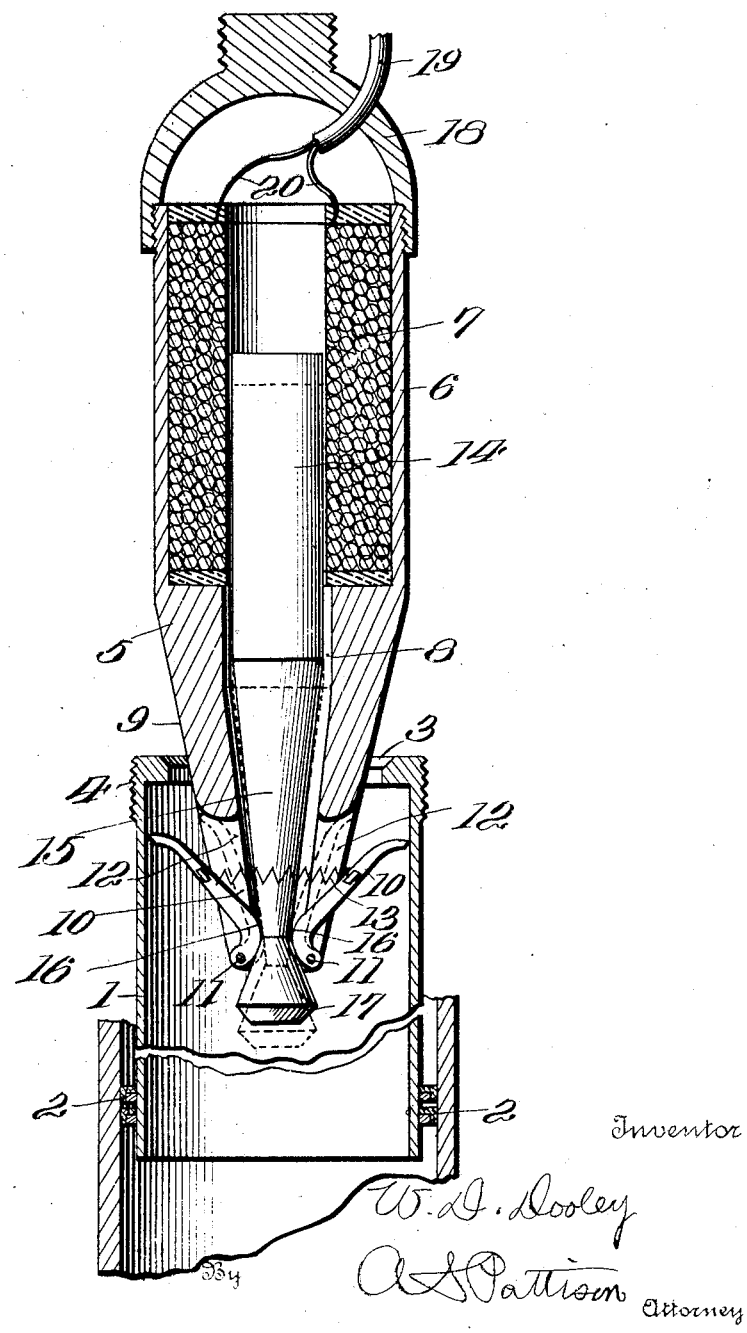

UNITED STATES PATENT OFFICE.

WILLIAM D. DOOLEY, OF DALLAS, TEXAS, ASSIGNOR, BY MESNE ASSIGNMENTS, TO L. D. BOWSER, OF DALLAS, TEXAS.

MAGNETICALLY-OPERATED OIL-WELL FISHING-TOOL.

1,374,834. Specification of Letters Patent. Patented Apr. 12, 1921.

Application filed April 26, 1920. Serial No. 376,632.

*To all whom it may concern:*

Be it known that I, WILLIAM D. DOOLEY, a citizen of the United States, residing at Dallas, in the county of Dallas and State of Texas, have invented certain new and useful Improvements in Magnetically-Operated Oil-Well Fishing-Tools, of which the following is a specification, reference being had therein to the accompanying drawing.

This invention relates to improvements in magnetically operated oil-well fishing tools, and is particularly intended for fishing and lifting pilot valve casings which have been dropped or lost in the well.

The primary object of my invention is to provide a housing having at its lower end means adapted to be projected in engagement with the inside of a casing, and a longitudinally movable member for projecting said means, and the upper portion of the housing having an electrically controlled magnet for moving the member longitudinally to cause the means at the lower end of the housing to be projected in contact with the interior of the casing.

Another object of my invention is to provide a housing having at its upper end a solenoid coil, its lower end tapered and carrying laterally movable dogs, and a solenoid armature or core having its lower end constructed to move the dogs outward when the core is magnetically drawn upward through the coil for causing the dogs to engage the inner side of a casing.

Another object of my invention is to provide an electrically operated fishing tool of the construction hereinafter shown and described.

The accompanying drawing is a vertical central sectional view of my electrically operated fishing tool, shown in operative relation to a lost casing that is to be lifted from the well.

It is well known to those skilled in the art of oil wells and their appurtenances, that in many instances the oil is pumped from the well, and that a pump plunger is reciprocated within the casing. It is also well-known that the pump plunger rod becomes detached from the pump plunger casing and it becomes necessary to fish this lost plunger from the well in order to make the necessary repair or connection.

My present improvement is more particularly intended for fishing out of the well those lost pump plungers or casings, though it is adapted to lift out or pull from the well small casings or parts of casings, and, therefore, the scope of my present invention is sufficiently comprehensive to include any use to which the construction is adapted.

Referring now to the drawings, 1 indicates a pump plunger casings, or other casings, which it is desired to remove from the well. The lower portion of this casing 1 is provided with any suitable form of packing which will engage the inner side of the pump casing (not shown) and the upper end of the casing 1 is provided with a valve seat 3, usually of the form to operate with a ball valve (not shown). The upper end of the casing 1 is provided with external screw-threads 4, which receive a suitable valve gage (not shown), to which valve gage the plunger rod (not shown) is connected, all of which is well-known to those skilled in this art.

My present improved fishing tool comprises a housing 5, preferably made of brass or other unmagnetic material and its upper portion is hollowed out as at 6 to receive a solenoid coil 7. Below the hollowed out portion the body 5 is tapered to its lower end and provided with a longitudinal opening 8, which extends to the lower end of the body and connects with the interior of the hollow solenoid coil 7.

The extremity of the tapered end 9 is provided with two upwardly extending dogs 10, which are pivoted at their lower ends 11 and are located in vertical slots 12, formed in the tapered lower end 9 of the housing. A suitable coiled spring 13 serves to hold these dogs normally inward, as shown in dotted lines in the drawings.

A solenoid armature or core 14 is located within the coil 7 to be moved longitudinally therein when the coil is magnetized and operating in a well-known manner. The armature 14 is provided with an extension 15, which is tapered and passes down between the lower inwardly curved portions 16 of the dogs 10, and a tapered or conically formed head 17 projects from the lower tapered extremity of the extension 15. This head 17 is normally beyond the lower end of the housing and below the dogs. A plunger rod connection 18 is suitably attached to the upper end of the housing 5, whereby the tool may be lowered into or removed from the well.

A suitable cable 19 forms a housing for the ends 20 of the coil 7, thus forming an electrical circuit or connection which will extend to the top of the well, and the current is applied to the coil by means of any suitable wedge (not shown).

In operation, the tool is lowered in the well and its lower tapered end will enter the pump plunger or other casing which it is desired to lift from the well. When it has reached this point an electrical current is caused to flow through the coil which will suddenly draw the armature 14 upward into the coil and cause the lower tapered head 17 to engage the curved portions 16 of the dogs 10 and throw them outward in the position shown in full lines in the drawing, causing them to engage and bite into the inner wall of the casing 1. The casing can then be drawn from the well by pulling the tool upward.

I do not limit my invention to the particular detailed construction here shown, for that may be varied without departing from the spirit and scope of my invention as defined in the appended claims.

Having thus described my invention, what I claim and desire to secure by Letters Patent is:—

1. A fishing tool of the character described, comprising a housing having at its upper end an electric magnet, its lower end tapered and provided with outwardly movable dogs, an armature actuated by the coil and constructed to throw the dogs outward for the purpose described.

2. A fishing tool of the character described, comprising a housing having at its upper end a magnetic hollow solenoid coil, the lower end of the housing tapered and its extremity provided with upwardly extending pivoted dogs, an armature for the coil extending to the dogs and shaped to engage the dogs and force their upper ends outward when the armature is moved upward by the magnetic influence of the solenoid coil, for the purpose described.

3. A fishing tool of the character described, comprising an elongated housing having its upper end provided with an electric solenoid hollow coil, the lower end of the housing tapered and provided with a longitudinal opening passing therethrough and communicating with the longitudinal opening of the solenoid coil, the lower tapered end of the housing having pivoted dogs, the armature having an extension passing downward between the dogs and carrying an enlarged head below the dogs, the dogs extending inward to be engaged by the armature head when moved upward, thereby forcing the upper ends of the dogs outward, for the purpose described.

4. A fishing tool of the character described, comprising a housing having at its upper end a hollow electric solenoid coil, its lower end elongated and tapered downwardly and having a longitudinal opening communicating with the opening of the coil, the extremity of the lower tapered portion having longitudinal slots, dogs pivoted at their lower ends and located within the slots, the dogs curved inwardly above their pivotal points, a longitudinally movable armature coöperating with the solenoid coil and having an extension extending between the dogs and carrying an enlarged head below the dogs to engage their curved portions when the armature is moved upward for the purpose described.

5. A fishing tool of the character described, comprising a housing, hollowed out at its upper portion, a solenoid coil within the hollowed out portion, the housing extending downward and tapered, the tapered portion having a longitudinal opening communicating at its upper end with the solenoid and open at its lower end, the dogs having their lower ends pivoted to the lower end of the tapered portion of the housing, the dogs curved inwardly above their pivotal points and extending into said longitudinal opening, a spring for normally holding the dogs inward, an armature within the coil, a downward extension connected with the armature and having a downwardly tapered portion between the dogs, the lower end of the extension having a head adapted to engage the dogs and force them outward, for the purpose described.

6. A fishing tool of the character described, comprising a housing carrying at its upper end a hollow solenoid coil, the lower end of the housing tapered downward and having a longitudinal opening communicating with the coil, upwardly extending dogs pivoted to the lower end of the tapered portion of the housing and extending into the said longitudinal opening, an armature for the coil longitudinally movable therein under the magnetic influence thereof, the armature having a tapered extension adapted to force the dogs outward when the armature is moved longitudinally in the coil, for the purpose described.

In testimony whereof I hereunto affix my signature.

WILLIAM D. DOOLEY.